United States Patent
Schmid et al.

(10) Patent No.: US 7,162,872 B2
(45) Date of Patent: Jan. 16, 2007

(54) EXHAUST GAS TURBOCHARGER FOR AN INTERNAL COMBUSTION ENGINE

(75) Inventors: Wolfram Schmid, Nürtingen (DE); Siefried Sumser, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/159,391

(22) Filed: Jun. 22, 2005

(65) Prior Publication Data
US 2005/0252211 A1 Nov. 17, 2005

Related U.S. Application Data

(63) Continuation-in-part of application No. PCT/EP03/13071, filed on Nov. 21, 2003.

(30) Foreign Application Priority Data
Dec. 23, 2002 (DE) .............................. 102 60 778

(51) Int. Cl.
F02D 23/00 (2006.01)
F02B 37/12 (2006.01)
F02B 37/00 (2006.01)

(52) U.S. Cl. .................. 60/602; 415/145; 415/205; 415/206; 417/406

(58) Field of Classification Search .............. 60/602; 415/145, 205, 206; 417/406
See application file for complete search history.

(56) References Cited

U.S. PATENT DOCUMENTS

| | | | | |
|---|---|---|---|---|
| 2,366,365 A | * | 1/1945 | Sorensen | 60/605.1 |
| 4,406,126 A | | 9/1983 | Yokokura et al. | 60/602 |
| 4,611,465 A | | 9/1986 | Kato et al. | 60/602 |
| 5,839,281 A | * | 11/1998 | Sumser et al. | 60/602 |
| 5,855,117 A | * | 1/1999 | Sumser et al. | 60/602 |
| 5,943,864 A | | 8/1999 | Sumser et al. | 60/602 |
| 6,202,413 B1 | * | 3/2001 | Baker et al. | 60/602 |
| 6,767,185 B1 | * | 7/2004 | Martin et al. | 60/602 |

FOREIGN PATENT DOCUMENTS

| | | | | |
|---|---|---|---|---|
| DE | 3606944 A1 | * | 9/1987 | 60/602 |
| DE | 43 12 078 | | 10/1994 | |
| DE | 198 36 677 | | 2/2000 | |
| DE | 101 12 521 | | 12/2001 | |
| EP | 0 860 589 | | 8/1998 | |
| GB | 1 531 080 | | 11/1978 | |
| GB | 2059515 A | * | 4/1981 | |
| JP | 55025505 A | * | 2/1980 | 60/602 |
| JP | 56083517 A | * | 7/1981 | |
| JP | 11 079 153 | | 10/2000 | |

* cited by examiner

Primary Examiner—Thai-Ba Trieu
(74) Attorney, Agent, or Firm—Klaus J. Bach

(57) ABSTRACT

In an exhaust gas turbocharger of an internal combustion engine including a compressor arranged in the intake duct and a turbine arranged in the exhaust duct of the engine, wherein the turbine includes in its housing an exhaust collection chamber from which the exhaust gas is directed via turbine inlet passage to the turbine wheel, the housing also includes a bypass arrangement for conducting part of the exhaust gas to the turbine exhaust structure in a turbine wheel bypass line which includes an ejector structure forming a gas pumping device.

13 Claims, 3 Drawing Sheets

Figure 1:
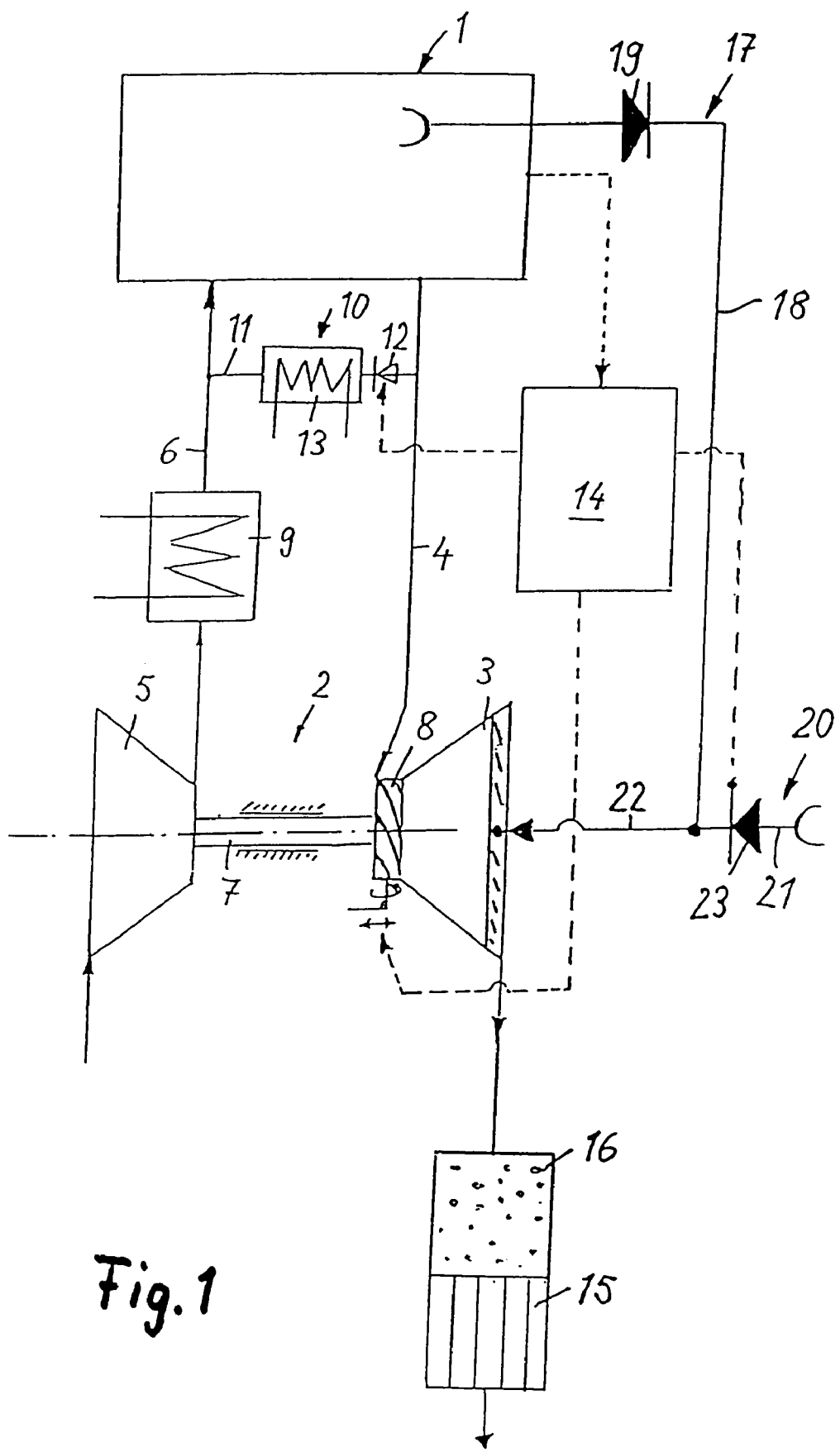

EXHAUST GAS TURBOCHARGER FOR AN
INTERNAL COMBUSTION ENGINE

This is a Continuation-In-Part Application of International Application PCT/EP03/13071 filed Nov. 21, 2003 and claiming the priority of German application 102 60 778.8 filed Dec. 13, 2002.

BACKGROUND OF THE INVENTION

The invention relates to an exhaust gas turbocharger for an internal combustion engine including a compressor arranged in the intake duct and an exhaust gas turbine arranged in the exhaust duct of the engine in a turbine housing having an exhaust gas collection chamber from which the exhaust gas is directed onto the turbine wheel via a turbine inlet passage and a bypass arrangement for bypassing the turbine inlet passages.

DE 43 12 078 A1 discloses a turbocharged internal combustion engine with an exhaust gas turbine in the exhaust duct and a compressor in the intake duct of the internal combustion engine. By the compressor, the combustion air is compressed to an increased charge pressure with which the air is supplied to the cylinders of the engine. The compressor is provided with an auxiliary compressor which is mounted on the same shaft as the main compressor and is also driven by the exhaust gas turbine. The auxiliary compressor compresses recirculated exhaust gas to a higher pressure so that it can be admixed to the air mass flow supplied to the main compressor.

Because of the pre-compression of the exhaust gases in the auxiliary compressor, the spectrum of the operating conditions for the exhaust gas recirculation can be expanded. However, the additional auxiliary compressor requires relatively high construction expenditures.

U.S. Pat. No. 4,611,465 discloses an exhaust gas turbocharger for an internal combustion engine in the intake duct and an exhaust gas turbine in the exhaust duct of the engine. The exhaust gases of the internal combustion engine are supplied to a spiral exhaust gas collection chamber which is arranged in the turbine housing and from which the exhaust gases are admitted to the turbine wheel. The exhaust gases flow then via inlet passages to the turbine wheel for driving the turbine.

The internal combustion engine described in the U.S. Pat. No. 4,611,465 includes two cylinder banks whose exhaust gases are supplied separately to a respective turbine inlet channel of the exhaust gas turbine. From each turbine inlet channel an exhaust gas bypass line branches off and the two bypass lines extend to a common line section in which a charge pressure-controlled bypass valve is arranged. The common bypass line section is connected to the exhaust duct downstream of the exhaust gas turbine. The bypass valve is opened when the charge pressure in the intake duct downstream of the compressor exceeds a predetermined threshold so that then the exhaust gas is directly conducted to the exhaust duct while bypassing the turbine wheel.

The exhaust gas bypass line extends outside the turbine housing and joins the exhaust gas duct also outside the turbine housing downstream of the exhaust gas turbine. The bypass arrangement has the sole purpose of reducing an excess pressure or, respectively, avoiding the development of such an excess pressure. Other functions cannot be accomplished.

It is the object of the present invention to provide, with simple construction means, an exhaust gas turbocharger which, beyond its basic function as compressor for the combustion air of the internal combustion engine, can also serve as a gas supply pump.

SUMMARY OF THE INVENTION

In an exhaust gas turbocharger of an internal combustion engine including a compressor arranged in the intake duct and a turbine arranged in the exhaust duct of the engine, wherein the turbine includes in its housing an exhaust collection chamber from which the exhaust gas is directed via turbine inlet passage to the turbine wheel, the housing also includes a bypass arrangement for conducting part of the exhaust gas to the turbine exhaust structure in a turbine wheel bypass line which includes an ejector structure forming a gas pumping device.

Because of the pressure drop in the gas flow of the exhaust gas from collection chamber to the exit area of the turbine, a suction action can be achieved by which the gas in the gas line is sucked into the exit area of the turbine. The gas turbine in this case also performs the function of a gas pumping device. This pumping function can be established solely by connection of the gas pumping line to the bypass line of the turbine inlet flow passages by way of which the main mass flow of the exhaust gas from the exhaust duct is admitted to the turbine wheel. The partial mass flow of the exhaust gas conducted through the exhaust gas bypass line is expediently not more than 5% of the exhaust gas mass flow through the exhaust gas turbine and is preferably in the range of 1% to 2%.

The pumping function can be improved by providing in the exhaust gas bypass, a nozzle area with reduced flow cross-section and the gas pumping line joins the bypass line in the area of the smallest flow cross-section. As the pressure in the gas flow drops as it flows with increased speed through the reduced flow cross-section area the pressure of the exhaust gas is further reduced, which provides for an increased pumping effect in the gas pumping arrangement.

As nozzle structure in the exhaust gas bypass line, an ejector structure may be integrated into the bypass line around which the exhaust gas flows and by way of which the gas mass flow from the gas pumping arrangement is introduced into the bypass line. The ejector structure includes herefor an exit opening for admitting the gas mass flow from the pumping arrangement to the exhaust gas bypass line.

The bypass line extends preferably annularly around the turbine wheel wherein a plurality of ejector components are arranged distributed over the circumference and between adjacent ejector components a narrow nozzle cross-section is formed. The ejector components may be of the same kind, particularly identical or mirror symmetrical. In accordance with another embodiment, they may differ in design such that the nozzle inlet cross-section disposed between two adjacent ejectors and the nozzle discharge cross-section provide for different flow directions for the gas flowing therethrough. In this way, additional flow effects can be obtained.

In the ejector component, there is expediently a discharge channel for the gas pumping line wherein the discharge channel extends about normal to the direction of the exhaust gas flow in the bypass line. This embodiment provides for a simple connection of the gas pumping line to the ejector component. The discharge channel is connected to the bypass line by way of the discharge opening wherein the discharge opening may have the shape of a slot and be oriented essentially parallel to the orientation of the nozzle discharge cross-section, so that the gas entering the bypass line has essentially the same flow direction as the exhaust gas flowing through the bypass line. In this way, the suction effect provided by the exhaust gas flow is improved.

The gas pumping arrangement may be used for example as a pump for a crankcase venting arrangement, by way of which oil-containing vent gases are removed from the crankcase and are subjected to a cleaning step. The exhaust gas turbine in this case takes on the function of a pump for the venting gases and pumps them—after passing them through an oil separator—into the exhaust gas duct.

In another advantageous utilization of the invention, the gas pumping device forms a device for the introduction of ambient air into the exhaust duct downstream of the exhaust gas turbine wheel. The ambient air introduced into the exhaust duct can be used in a catalytic converter arranged downstream of the turbine for supporting the catalytic functions and/or to a soot filter for burning off the soot whereby the exhaust gas flow can be improved particularly after a cold start of the engine. The invention will become more readily apparent from the following description of expedient embodiments thereof on the basis of the accompanying drawings.

BRIEF DESCRIPTIONS OF THE DRAWINGS

Figure 2:
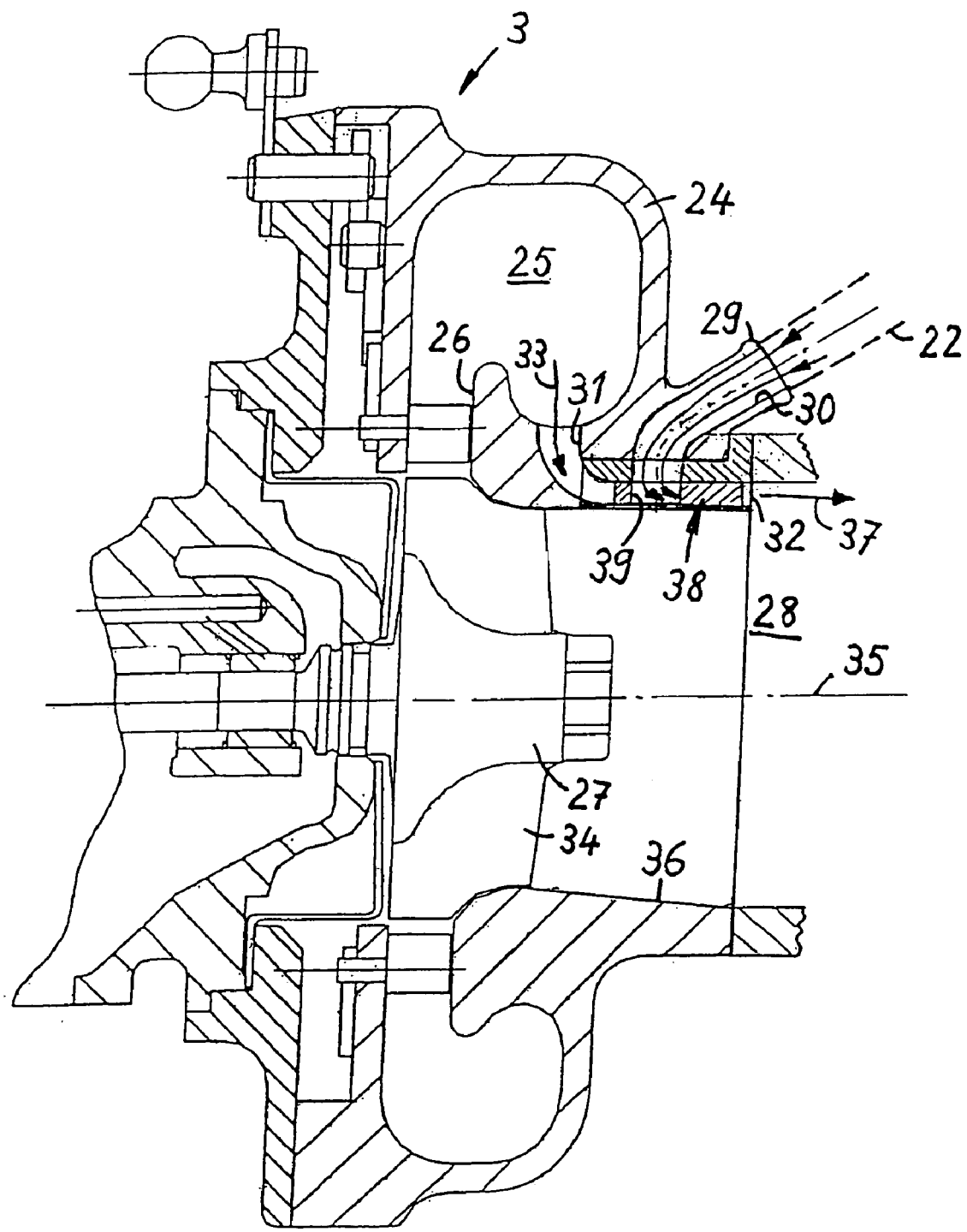
Figures 3, 3A:
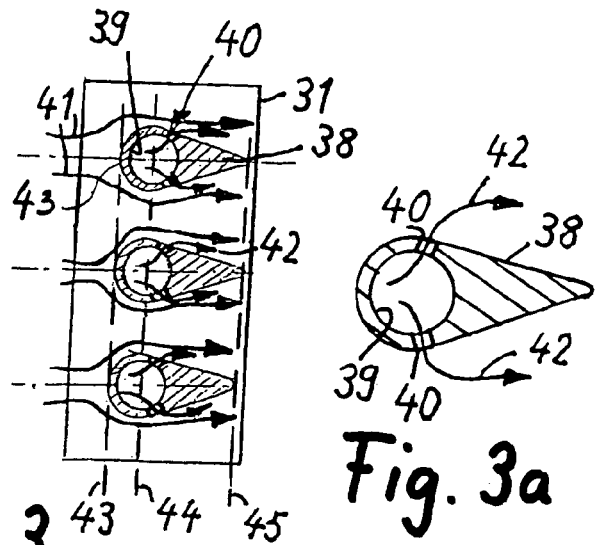
Figure 4:
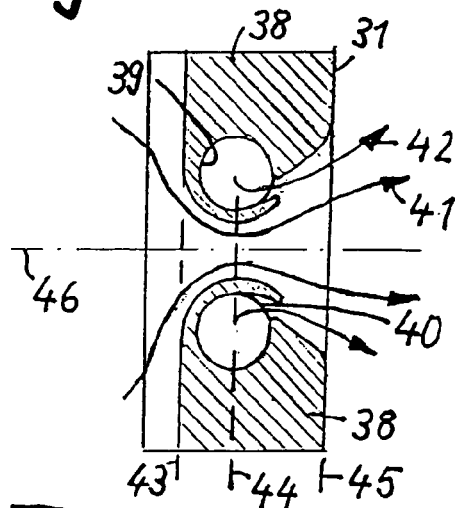
Figure 5:
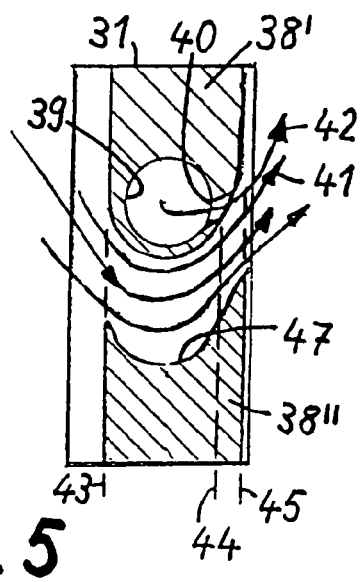

FIG. 1 shows schematically an internal combustion engine with an exhaust gas turbocharger whose exhaust gas turbine forms also a pump for a crankcase venting arrangement and for an air introduction structure, FIG. 2 is a cross-sectional view of the exhaust gas turbine with a connection tube connected to the turbine housing, through which the gas to be pumped is supplied to the turbine outlet duct, FIG. 3 is a cross-sectional view of an annular bypass line extending around the turbine wheel projected into a plane. The bypass line is disposed in the turbine housing and includes a plurality of ejector components in the form of nozzles by way of which the gas being pumped is introduced into the bypass line, FIG. 3a is an enlarged representation of an ejector component, FIG. 4 shows a section of a bypass line with two ejector components of an alternative embodiment, and FIG. 5 shows a section of the bypass line in accordance with another embodiment of the invention.

DESCRIPTION OF PREFERRED EMBODIMENTS

In the various figures, identical components are designated by the same reference minerals.

The internal combustion engine 1 which is shown in FIG. 1 and which may be a gasoline engine or a diesel engine includes an exhaust gas turbocharger 2 with an exhaust gas turbine 3 in the exhaust duct 4 and a compressor 5 in the intake duct 6. The exhaust gas turbine 3 is driven by the exhaust gases of the internal combustion engine which are still under a certain pressure. The compressor 5 is driven by the exhaust gas turbine 3 via a shaft and takes in ambient air and compresses it to an increased charge air pressure. The exhaust gas turbine 3 includes a variable turbine inlet vane structure 8 for controlling the effective turbine inlet flow passage. Downstream of the compressor 5, the intake duct 6 includes a charge air cooler 9 in which the air compressed in the compressor 5 is cooled. Downstream of the charge air cooler 9, the pressurized charge air is supplied to the cylinder inlets of the internal combustion engine 1.

The internal combustion engine 1 also includes an exhaust gas recirculation system 10 which comprises a recirculation line 11 extending between the exhaust duct 4 upstream of the exhaust gas turbine 3 and the intake duct 6 downstream of the charge air cooler 9. An adjustable exhaust gas recirculation valve 12 and a cooler 13 are integrated into the recirculation line 11.

The internal combustion engine 1 further includes a crankcase venting system 17, which includes a gas conduit 18 extending between the crankcase of the internal combustion engine and the exhaust gas turbine 3. The gas conduit 18 includes a check valve 19 which opens toward the exhaust gas turbocharger 3 and closes in the opposite direction to prevent backflow of the gas into the crankcase. The valve 19 may also be in the form of a controllable valve.

The internal combustion engine 1 further includes an air injection arrangement which takes in fresh ambient air and supplies it via the exhaust gas turbine 3 to the catalytic converter 15 and the soot filter 16 in order to support the catalytic converter operation particularly following a cold start of the engine and the burning off of the soot in the soot filter 16. The air injection arrangement 20 comprises a gas supply line 21 by way of which the combustion air is taken in from the ambient and in which an adjustable control valve 23 is disposed. The gas supply line 21 of the air injection arrangement 20 extends, together with the gas conduit 18 of the crankcase venting system 17, via a common conduit section 22 to the exhaust gas turbine 3.

All adjustable auxiliary devices of the internal combustion engine are controlled by the control unit 14 depending on the various operating conditions. This is true for the exhaust gas recirculation valve 12 in the exhaust gas recirculation line 10, the variable turbine inlet vane structure 8 in the exhaust gas turbine and the valve 23 in the air injection arrangement 20.

The cross-sectional view of the exhaust gas turbine according to FIG. 2 shows that the turbine housing 24 includes a spiral channel 25 which forms a collection chamber for the exhaust gas supplied by the internal combustion engine. From the spiral channel 25 the exhaust gas is conducted, by way of inlet flow passage 26 in which a variable guide blade structure 8 is disposed, radially onto the turbine wheel 27, which is provided with blades 34. The exhaust gas flowing through the turbine wheel 27 drives the turbine wheel and subsequently leaves the turbine 3 at reduced pressure via the exhaust duct 28 and, further downstream in the exhaust duct, is subjected to a purification procedure.

At the turbine housing 24, a connecting stub pipe 29 is provided in which a connecting passage 30 is disposed. The pipe section 22 of the crank housing venting system and/or the air injection arrangement 20 is connected to the stub pipe 29. By way of the stub pipe 29 either venting gases from the crankcase or ambient air is supplied to the exhaust gas turbine 3.

The turbine inlet flow passages 26 by way of which exhaust gas is directed from the exhaust gas collection chamber, or respectively, the spiral channel 25 onto the turbine wheel 27 is bypassed by an exhaust gas bypass structure 31, which is formed in the turbine housing 24. It extends around an exhaust gas flow channel 36 in the form of an exhaust diffuser 36 forming the turbine exhaust duct 28. The bypass structure 31 branches off the spiral channel 25 and extends axially into the area of the exhaust duct 28. By way of the bypass structure 31, a partial mass flow of the exhaust gases is conducted out of the spiral channel 25 in the direction of the arrow 33 radially into the bypass structure 31 and then in the direction of the arrow 37 axially out of the bypass structure in the area 32. The connecting passage 30 extends radially to the axially extending section of the bypass structure 31. Because of the pressure difference between the spiral channel 25 and the exhaust duct 28, a pumping action is obtained in the ejector by which gas supplied via the pipe section 22 and the connecting passage 30 is transported into the bypass structure 31 and to the exhaust duct 28.

The bypass structure 31 is expediently annular. It preferably includes at least one ejector component 38, which has the function of a nozzle and by way of which the gas of the gas pumping arrangement is admitted to the bypass structure 31. Expediently, a plurality of ejector components 38 is provided in the bypass structure 31 by way of which the gas is introduced into the bypass structure 31, however the gas may also be introduced only via one or a limited number of ejectors. The ejector part 38 includes a discharge passage 39, which is in communication with the connecting passage 30 in the connecting duct 29 and which extends about normal to the flow direction in the bypass structure 31. The discharge passage 39 in the ejector passage 39 of the ejector part 38 includes an ejector opening (indicated in FIGS. 3 to 5 by reference numeral 40) by way of which the gas is conducted into the bypass structure 31 and then to the exhaust duct 28.

The nozzle-forming ejector components in the bypass structure 31 ensure with their reduced flow cross-section that only a relatively small part of the exhaust gas is conducted via the bypass passage 31 into the exhaust duct 28 of the turbine which bypassing the turbine wheel 27. Expediently, the exhaust gas stream conducted through the bypass structure 31 is not more than 5% of the exhaust gas mass volume flowing through the turbine. Preferably, values of 1 to 2% are realized.

FIG. 3 is a sectional view of a segment of the bypass structure 31 projected into a plane. The bypass structure includes a plurality of ejector components 38 which are uniformly distributed over the circumference in a parallel flow arrangement and which have a streamlined contour past which the exhaust gas flows as indicated by the arrows 41. The gas to be pumped is supplied to the bypass structure 31 by way of the ejector passages 39, see FIG. 3a. Each ejector passage 39 is in communication with the bypass flow nozzles by slot-like exit openings 40 by way of which the gas to be admitted can flow into the exhaust gas as indicated by the arrows 42.

Every two adjacent parallel adjacent ejector components 38 form within the bypass structure 11, a nozzle whose narrowest flow cross-section is in the area of the circular section of the ejector components 38, which, in the flow direction of the exhaust gas become narrower toward the pointed exit end. The nozzle inlet cross-section, the front end of an ejector component facing the exhaust gas flow—is indicated by the reference numeral 43; the narrowest nozzle flow cross-section between adjacent ejector components is designated by the reference numeral 44 and the nozzle exit cross-section—in the area of the tip at the downstream end of the ejector component 35—is designated by the reference numeral 45. The discharge openings 40 are arranged downstream of the narrowest nozzle cross-section 44.

Also, in the exemplary embodiments shown in FIGS. 4 and 5, the exit openings 40 are disposed downstream of the narrowest nozzle cross-section between adjacent ejector components 38. In the arrangement as shown in FIG. 4, the respective two adjacent ejector components 38 are mirror symmetrical with respect to a plane 46 extending therebetween in flow direction wherein the wall section delimiting the discharge passage 39 in the ejector component 38 is circular. The exit openings 40 are so located that the gas exiting in the direction of the arrow 43 has a flow direction corresponding to the direction 41 of the exhaust gas flowing through the narrowest nozzle cross-section.

In the exemplary embodiment of FIG. 5, adjacent ejector components 38', 38" differ in their design. A first ejector component 38' corresponds about to the embodiment as shown in FIG. 4 with a discharge passage 39 with an exit opening 40 downstream of the narrowest nozzle flow cross-section 44 in the bypass structure 31. A second ejector component 38" has no discharge passage or exit opening for the admission of gas but is provided with a partially circular recess 47 which is complementary to the circular section of the adjacent ejector component 38' with the discharge passage 39. In this way, a curved flow passage is formed between the adjacent ejector components 38' and 38" whose narrowest nozzle cross-section 44 is displaced in the direction of the nozzle exit end 45. With the curved arrangement of the nozzle channel, a redirection of the exhaust gas flow through the bypass structure is obtained so that the outflow of the exhaust gas at the nozzle exit 45 has a direction different from the exhaust gas at the nozzle inlet 43.

What is claimed is:

1. An exhaust gas turbocharger for an internal combustion engine including an intake duct (6) and an exhaust duct (4) with a compressor (5) arranged in the intake duct (6) and an exhaust turbine (3) arranged in the exhaust duct (4), said exhaust turbine (3) having a turbine housing (24) with an exhaust gas collection chamber (25), a turbine wheel (27) rotatably supported in the turbine housing (24), a turbine inlet passage for conducting exhaust gases from the exhaust gas collection chamber (25) to the turbine wheel (27), an exhaust structure (28) for discharging exhaust gas from the turbine (4) and an exhaust gas bypass structure (31) bypassing the turbine wheel within the turbine housing (24) for conducting exhaust gas from the exhaust gas collection chamber (25) directly to the exhaust structure (28), and a gas pumping means including a nozzle structure (38) arranged in the bypass structure (31) in the turbine housing (24) with a gas pumping line (18, 21) connected to a connection stub (29) of the turbine housing (24) in communication with the structure (38).

2. An exhaust gas turbocharger according to claim 1, wherein the nozzle structure (38) includes a nozzle with reduced flow cross-section and a gas pumping line (18, 21) joins the exhaust gas bypass structure (31) downstream next to the narrowest cross-section of the nozzle.

3. An exhaust gas turbocharger according to claim 1, wherein the nozzle structure is formed by an airfoil-shaped ejector component (38) disposed in the bypass flow and including an ejector passage (39) in communication with the connection stub (29) and having an opening (40) to the exhaust gas bypass structure (31) for generating a suction in the ejector passage (39).

4. An exhaust gas turbocharger according to claim 3, wherein the ejector passage (39) extends in the ejector component 38 normal to the direction of the exhaust gas bypass flow-through the ejector component (38) and the opening (40) is disposed at the downstream side of the ejector component (38).

5. An exhaust gas turbocharger according to claim 3, wherein the ejector component (38) in the bypass structure (31) has a cross-section which tapers down in the flow direction of the exhaust gas through the ejector component (38).

6. An exhaust gas turbocharger according to claim 3, wherein the exhaust gas bypass structure (31) extends annularly around the turbine exhaust duct (28) and includes a plurality of ejector components (38) uniformly distributed over the circumference of the turbine exhaust duct (28), wherein between adjacent ejector components (38) a nozzle flow cross-section (44) is formed.

7. An exhaust gas turbocharger according to claim 6, wherein the ejector components (38) distributed over the circumference of the turbine exhaust duct (28) are all the same.

8. An exhaust gas turbocharger according to claim 6, wherein the ejector components (38) distributed over the circumference of the turbine exhaust duct (28) comprise at least two different types, wherein two adjacent ejector components (38) define a nozzle flow cross-section with differently oriented inlet and outlet flow directions.

9. An exhaust gas turbocharger according to claim 8, wherein the two adjacent ejector components have in the area of the narrowest nozzle crosssection convex and, respectively, concave shapes.

10. An exhaust gas turbocharger according to claim 1, wherein the exit openings (40) are in the form of slots.

11. An exhaust gas turbocharger according to claim 10, wherein the exit openings (40) extend essentially parallel to the nozzle discharge openings.

12. An exhaust gas turbocharger according to claim 1, wherein the gas pumping structure is connected to a crankcase venting system (17) of the internal combustion engine (1) and the gas pumping line (18) is connected to the crankcase of the engine.

13. An exhaust gas turbocharger according to claim 1, wherein the gas pumping structure is part of an air supply system (20) for pumping ambient air into the exhaust gas for improved combustion of exhaust deposits in a catalytic converter or a soot filter of the internal combustion engine.

* * * * *